United States Patent
Hiebl

(10) Patent No.: US 9,443,437 B2
(45) Date of Patent: Sep. 13, 2016

(54) PROCEDURE FOR AUTOMATICALLY LANDING AN AIRCRAFT

(75) Inventor: Manfred Hiebl, Sauerlach (DE)

(73) Assignee: EADS Deutschland GmbH, Ottobrunn (DE)

( * ) Notice: Subject to any disclaimer, the term of this patent is extended or adjusted under 35 U.S.C. 154(b) by 537 days.

(21) Appl. No.: 12/883,845

(22) Filed: Sep. 16, 2010

(65) Prior Publication Data

US 2011/0066307 A1 Mar. 17, 2011

(30) Foreign Application Priority Data

Sep. 17, 2009 (DE) .......... 10 2009 041 652

(51) Int. Cl.
*G08G 5/02* (2006.01)
*G08G 7/00* (2006.01)
*G05D 1/06* (2006.01)
*G08G 5/00* (2006.01)

(52) U.S. Cl.
CPC ............ *G08G 5/025* (2013.01); *G05D 1/0684* (2013.01); *G08G 5/0013* (2013.01); *G08G 5/0069* (2013.01); *G08G 7/00* (2013.01)

(58) Field of Classification Search
CPC ... G01S 13/913; G01S 19/15; G05D 1/0684;
G05D 1/0653; G05D 1/0676; G05D 1/0607;
G05D 1/101; G05D 1/10; G08G 5/0047;
G08G 5/0069; G08G 5/02; G08G 5/025;
G08G 7/00
USPC ................... 701/3–12, 14, 17, 18, 300, 302;
340/947, 950, 972; 244/175, 181, 183;
73/178 T; 342/33
See application file for complete search history.

(56) References Cited

U.S. PATENT DOCUMENTS 5,588,387 A * 12/1996 Tellington .............. 114/261
2008/0319592 A1* 12/2008 Colclough ............... 701/16
2011/0307126 A1* 12/2011 Hogstrom ................ 701/16

* cited by examiner

*Primary Examiner* — Spencer Patton
(74) *Attorney, Agent, or Firm* — Crowell & Moring LLP

(57) ABSTRACT

A procedure and system are provided for automatically landing an aircraft, particularly an unmanned aircraft on a moving, particularly floating landing platform, for example, on an aircraft carrier, the aircraft being equipped with an automatic navigation device and an automatic landing control device. The procedure includes detecting the position of an intended landing spot, detecting motion data of the landing platform, determining at least one imminent point in time at which the landing spot takes up a reference position, transmitting the point in time and the reference position of the landing spot to the landing control device of the aircraft, and controlling the aircraft such that it reaches the landing spot at the point in time.

9 Claims, 3 Drawing Sheets

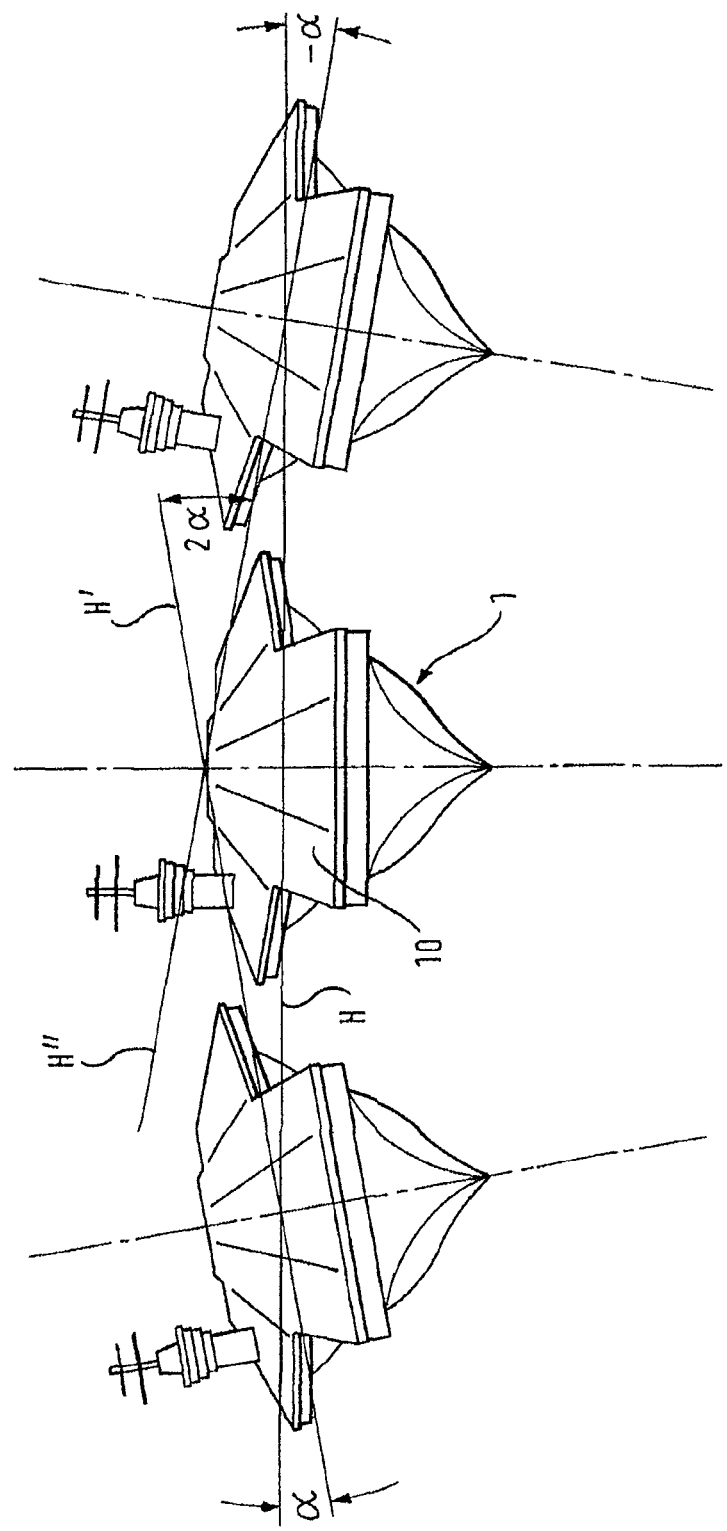

PROCEDURE FOR AUTOMATICALLY LANDING AN AIRCRAFT

This application claims priority under 35 U.S.C. §119 to German Patent Application No. DE 10 2009 041 652.8-56, filed Sep. 19, 2009, the entire disclosures of which are herein expressly incorporated by reference.

BACKGROUND AND SUMMARY OF THE INVENTION

The present invention relates to a procedure for automatically landing an aircraft, particularly an unmanned aircraft on a moving, particularly floating landing platform, for example, on an aircraft carrier. The invention further relates to a system for automatically controlling the landing of an aircraft on a moving platform.

The landing of an aircraft on a moving landing platform, particularly on an aircraft carrier, is difficult even for pilots of a manned aircraft. However, it is even more difficult to land an unmanned aircraft on a floating landing platform which is subject to constant wave motions. These wave motions may occur about the lateral axis as so-called pitching or about the longitudinal axis as so-called rolling. In the case of a combination of pitching and rolling, a movement about the vertical axis of the floating landing platform may even occur.

In addition, cross wind influences, not to be underestimated on water, may make the landing of aircraft on a floating platform more difficult. Particularly when landing remote-controlled unmanned aircraft, cross wind influences are very difficult to compensate.

As a result of the described movements of the landing platform about its three space axes and possibly along its three space axes, the landing threshold provided on the landing platform, which defines the intended landing spot, describes a constant movement about the space axes and possibly even along the space axes. This movement of the landing spot represents a considerable difficulty with respect to carrying out a precise-spot landing because the landing aircraft constantly has to be newly aligned.

Especially in the case of an aircraft carrier which, because of its length, hardly carries out motions about its lateral axis but, because of the height of its superstructure, is subject to a noticeable rolling motion about its longitudinal axis, the position of the intended landing spot as well as the relative position of the landing runway with respect to the longitudinal axis will fluctuate constantly with the frequency of the rolling motion. In the case of conventional approach procedures, this has the result that, because of the constant recorrecting of the attitude of the landing aircraft, the aircraft will fly a rolling course in the approach, whereby the danger of an imprecise landing or an aborting of a landing or even a crash landing will increase.

In practice, it is therefore first attempted to compensate the rolling motions of the ship by measures on board the aircraft carrier. In addition, a landing control officer (LCO), as a rule, is stationed on an aircraft carrier in the proximity of the landing spot. The landing control officer (LCO) has visual contact with the approaching aircraft, checks whether the aircraft is on the intended gliding path and conveys correction signals with respect to the aircraft attitude to the pilot by radio and by sign language. The landing of an aircraft on a moving platform, such as an aircraft carrier, is therefore very dependent on the capabilities of the crew of the aircraft and of the crew of the moving platform, so that automatic landings, as preferred for unmanned aircraft, have hardly been implementable.

It is therefore an object of the present invention to provide a procedure of the above-mentioned type for the automatic landing of an aircraft on a moving landing platform, by which safety during landing is clearly improved. Furthermore, a system for the implementation of such a procedure is provided.

In the case of the procedure according to the invention for the automatic landing of an aircraft, particularly of an unmanned aircraft, on a moving, particularly floating landing platform, such as an aircraft carrier, the aircraft being equipped with automatic navigation devices and an automatic landing control device, the following steps are carried out:

a) detecting the position data of an intended landing spot onboard the moving landing platform;

b) detecting of motion data of a motion of the landing platform about at least one of its space axes;

c) determination of at least one imminent point in time at which the landing spot takes up a reference position and preferably the landing platform takes up a reference alignment;

d) transmitting the point in time determined in Step c) as well as the reference position of the landing spot and/or the position data and motion data detected in Steps a) and b) and preferably also the reference alignment determined in Step c) to the landing control device of the aircraft;

e) controlling the aircraft such that the touchdown spot of the aircraft on the landing platform precalculated by the landing control device corresponds to the reference position of the landing spot and that the touchdown point in time precalculated by the landing control device, which corresponds to the point in time of the reaching of the touchdown spot, corresponds to the point in time determined in Step c).

By precalculating the point in time at which the landing spot takes up a defined reference position and preferably also the landing platform takes up a defined reference alignment, the motions of the landing platform can be ignored and the aircraft can carry out the approach at a constant attitude and on an essentially straight gliding path. The landing control of the aircraft therefore knows one or more points in time in the future at which the landing spot on the landing platform will take up a defined reference position, and also knows the coordinates of this (these) reference position(s) in an absolute coordinate system. The landing control can then select the flying speed over the ground and the rate of descent of the aircraft such that the touchdown spot computed from the actual position of the aircraft, the flying speed over the ground and the rate of descent as well as the height of the defined reference position of the landing spot at the computed point in time corresponds to the position of the landing spot in the space.

Since preferably the attitude of the aircraft as well as the reference alignment of the landing platform essentially correspond to one another at the point in time of the coincidence of the landing spot and the touchdown spot, thus at the moment of the touchdown, a soft landing of the aircraft on the moving landing platform can be predicted. As a result, a rolling course of the aircraft is avoided in the approach and the holding of the course of the aircraft in the approach is clearly facilitated, which is advantageous particularly for unmanned aircraft.

In a preferred embodiment of the procedure according to the invention, the cross wind influences can be reduced in that the longitudinal axis of the landing runway provided on the movable landing platform is turned into the wind before the landing.

Preferably, this alignment of the landing platform takes place continuously during the landing approach of the aircraft.

The reference position is preferably at least approximately horizontal. As a result, the touchdown of the aircraft on the landing platform can take place at a zero passage of the corresponding rolling motion about the space axis (axes), particularly about the rolling axis.

The procedure according to the invention is particularly effective when the space axis, for which the motion data are detected in Step d), is the longitudinal axis of the moving landing platform. As a result, the rolling motion of the landing platform can be neutralized for the landing approach.

Preferably, the space axis, for which the motion data are detected in Step b), is the lateral axis of the moving landing platform, whereby the pitching movement of the landing platform can be neutralized.

In another preferred variant of the procedure, the space axis, for which the motion data are detected in Step b), is the vertical axis of the moving landing platform, whereby a yawing motion of the landing platform is neutralized.

In a preferred further development of the procedure according to the invention, in Step b), also translatory motion data of the landing platform in the direction of at least one of the space axes are detected and are taken into account during the determination of the point in time in Step c) and these translatory motion data are transmitted in Step d) into the landing control device of the aircraft and are taken into account in Step e) when controlling the aircraft. For the landing approach of the aircraft, in addition to the neutralization of the motions of the landing platform about the space axes, a motion of the landing platform in the direction of one or more space axes can hereby also be taken into account, and this motion can thereby be neutralized.

The system for the automatic controlling of the landing of the aircraft on the moving landing platform controls the landing of the aircraft according to a procedure of the invention by position data of the landing spot provided on the landing platform, of motion data of the landing platform and/or of a previously determined point in time at which the landing spot will take up a reference position.

The landing control of the aircraft knows—as mentioned above—one or more points in time in the future at which the landing spot on the landing platform will take up a defined reference position, and also knows the coordinates of this (these) reference position(s) in an absolute coordinate system. The landing control receives these data or the information required for computing these data per wireless data transmission from the landing platform. The landing control also knows the actual position of the aircraft in the absolute coordinate system. The landing control will then select the flying speed over the ground and the rate of descent of the aircraft such that the touchdown spot computed from the actual position of the aircraft, the flying speed over the ground and the rate of descent as well as the height of the defined reference position of the landing spot at the computed point in time corresponds to the landing spot.

The controlling of the aircraft can preferably also take place while taking into account a predefined reference alignment of the landing platform at the reference point in time at which the landing spot will take up the reference position. If the reference alignment, for example, laterally of the approach direction is horizontal, it is thereby achieved that the aircraft can land horizontally, thus with a 0° roll angle.

Other objects, advantages and novel features of the present invention will become apparent from the following detailed description when considered in conjunction with the accompanying drawings.

BRIEF DESCRIPTION OF THE DRAWINGS

FIG. 1 is a schematic view of the rolling motions of a moving landing platform on the example of an aircraft carrier;

DETAILED DESCRIPTION

FIG. 1 shows three phases of the rolling motion of a ship 1 as a floating platform using the example of an aircraft carrier viewed toward the direction of the bow of the aircraft carrier. In the center representation of the three representations, the ship 1 is in a neutral position; i.e. the roll angle amounts to 0° and the deck 10 of the ship 1, on which the landing runway is situated, is aligned with respect to the rolling axis along a horizontal deck line H.

In the left representation, viewed about the angle α in the direction of travel, the ship is rolled clockwise (counterclockwise in the representation of FIG. 1, where the ship is seen from the front), so that the starboard side is lowered. The deck line H now extends at an inclination angle α with respect to the horizontal deck line H. In the right representation, viewed in the direction of travel, the ship is rolled counterclockwise about the angle −α, so that the portside is lowered. Now the deck line H" extends at the inclination angle −α with respect to the horizontal deck line H. The total extent of the rolling motion of the ship therefore amounts to 2α.

Figure 2A:
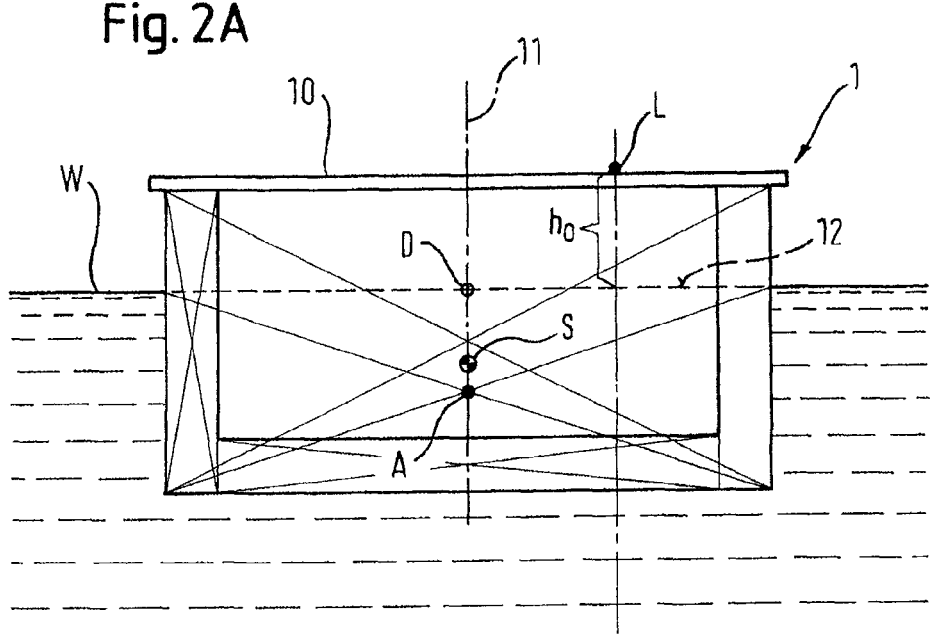
FIGS. 2A and 2B are schematic views of the geometrical regularities for describing the rolling motion in the case of ships.
Figure 2B:
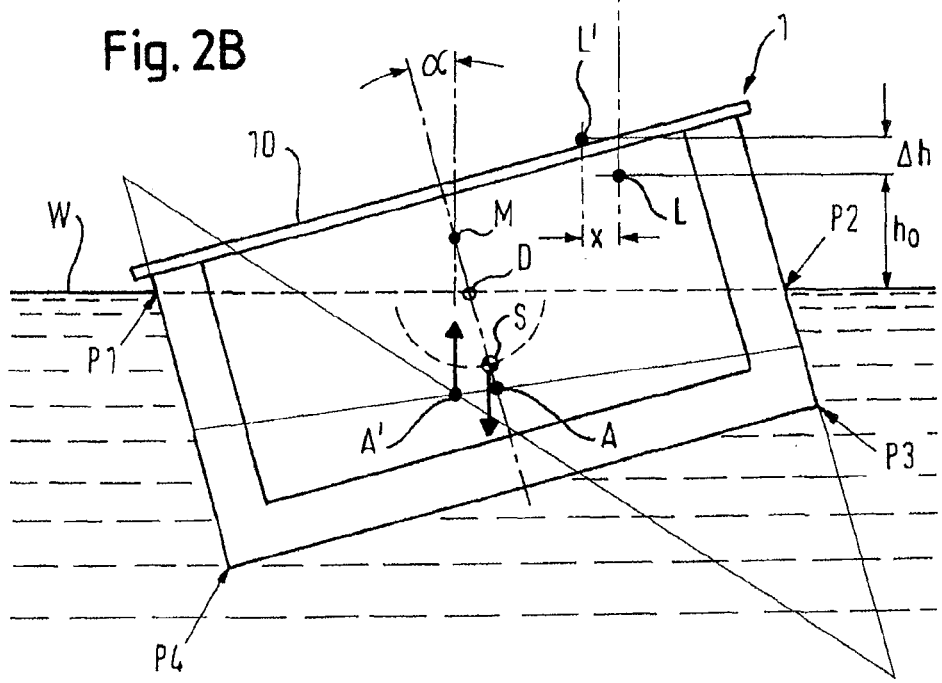

FIGS. 2A and 2B illustrate the rolling motion of the ship 1 by means of a geometrical model. In FIG. 2A, the ship 1 is in its neutral position in which the roll angle amounts to 0° and the deck 10 of the ship is aligned horizontally. The axis of rotation D, about which the ship is rolling, is situated on the water surface; in the example of FIG. 2A, therefore on the point of intersection of the perpendicular center plane 11 of the ship including the roll axis with the line 12 of the surface level of the water plane W. The center of gravity S of the ship and therefore also the point of application A of the lifting force are situated in the neutral position of FIG. 2A also in the center plane 11 of the ship, so that the lifting force applied to point A as well as the weight of the ship 1 applied to the center of gravity S are situated in the center plane 11 of the ship and therefore cancel one another. The ship 1 rests calmly in the water, in which case it is assumed that the water is still. The landing spot L on the landing runway provided on the deck 10 is situated by the amount h0 above the water line.

When the ship 1 now starts to experience a rolling motion, as illustrated in FIG. 2B, the point of application of the lifting force will be displaced from Point A situated on the center plane 11 of the hull to Point A', to which the lifting force is now applied and generates a righting torque about the metacenter M. The geometrical interrelationships analogously correspond to those of a rod pendulum with M as the suspension point.

FIG. 2B shows that, as a result of the rolling motion of the ship 1 about the angle α, not only the angular alignment of the deck 10 has changed with respect to the neutral position in FIG. 2A but that also the imaginary landing spot L of a landing runway provided on the deck 10 and illustrated in FIG. 2A has moved to the side by the amount x and has moved upward by the amount Δh.

An aircraft that wants to land on the landing runway of the deck 10 therefore has to continuously adapt its flight path to the upward and downward movement of the landing spot and also to its respective lateral displacement and, in addition, has to adapt its attitude, i.e. its own roll angle, such that, during the touchdown, it corresponds to the roll angle of the ship. Such a procedure, if the pilot can carry it out at all, results in a dangerous rolling course of the aircraft.

Figure 3:
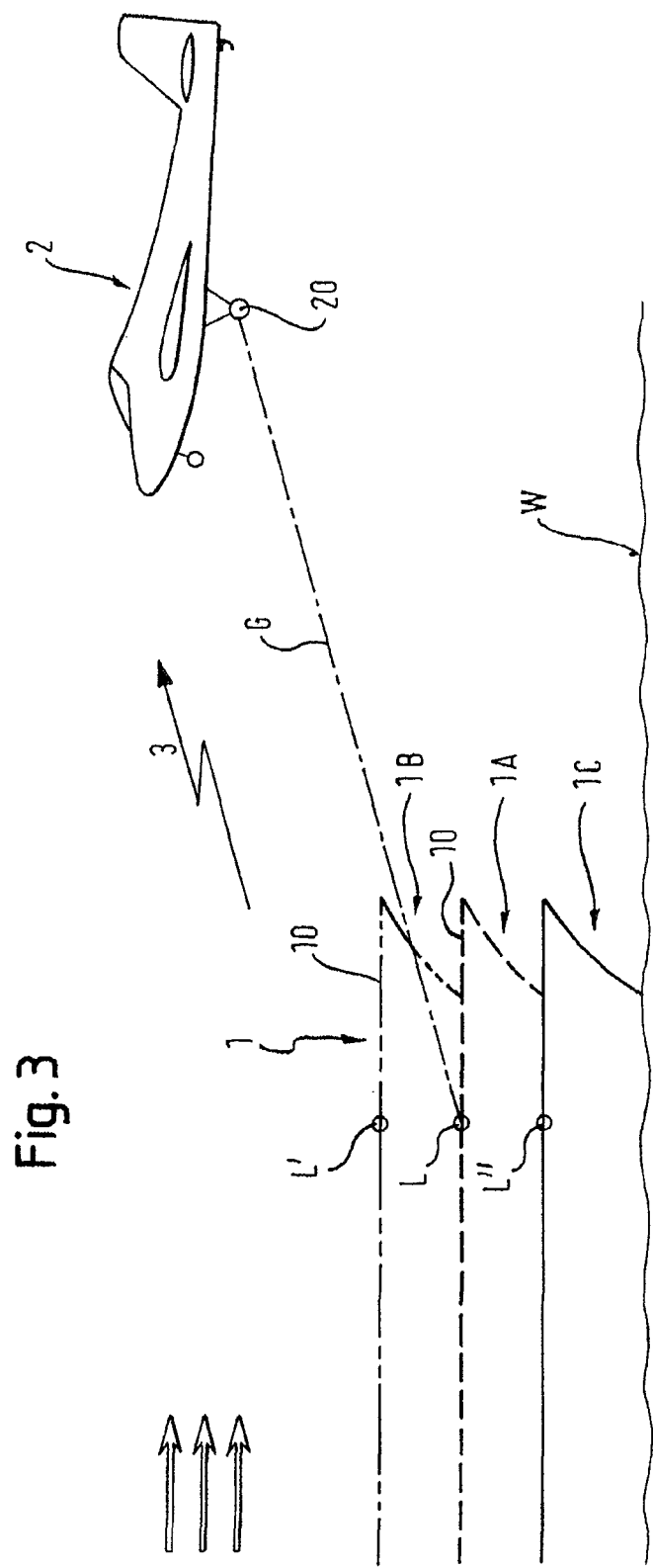
FIG. 3 is a schematic view of an approach flight onto a floating landing platform.

FIG. 3 is a schematic view of the gliding path G of an aircraft 2 landing on a ship 1, for example, an aircraft carrier, forming a moving platform. The ship 1 floats on the water surface W and is subject to a rolling motion, as illustrated in FIGS. 1 and 2B. The center representation 1A of the ship 1 illustrated by a uniformly broken line shows the ship 1 in the neutral position illustrated in FIG. 2A with a roll angle of 0° and a horizontal alignment of the deck 10 with respect to the roll axis. The upper, irregularly broken line shows a representation 1B of the ship 1 under the effect of a roll angle α, the position of the ship 1 shown therein corresponding to the position illustrated in FIG. 2B. The landing spot L' on deck 10 the ship 1 in position 1B is situated above the landing spot L in the neutral position 1A of the ship 1. Position 1C of the ship 1 in the case of a roll angle of −α is illustrated by a solid line. It corresponds to the position of the ship shown on the right in FIG. 1. In this position 1C of the ship, the landing spot L" is below the landing spot L of the neutral position 1A of the ship 1.

The incoming aircraft 2 is endeavoring to touch down by means of its main landing gear 20 on the landing spot L of the ship 1. Since, during the landing, the aircraft should be aligned horizontally in the direction of its lateral axis (therefore, should carry out no rolling motion), in order to have a maximal lift and in order to ensure an optimal simultaneous contact of the two laterally mutually spaced wheel of the main landing gear with the surface of the deck 10 of the ship 1, at the point in time of the touchdown, also the deck 10 should be aligned horizontally in the lateral direction with respect to the gliding path G of the incoming aircraft 2. This is the case in the neutral position of the ship 1 illustrated in FIG. 2A, which corresponds to representation 1A of the ship in FIG. 3. In an ideal case, the ship 1 as well as the landing aircraft 2 should therefore have a roll angle of 0°.

In order to achieve this object at least approximately, the steps listed in the following are carried out according to the invention.

First, the ship 1, the moving and movable landing platform, is turned about its vertical axis such that the landing runway provided on the deck is pointed into the wind, which is symbolized by the arrows on the left in FIG. 3. It is thereby achieved that, in the landing approach, the landing aircraft 2 is exposed to no or to only slight cross wind influences.

Onboard the ship 1, the precise position data of the landing spot L, L', L" on the deck 10 of the ship 1 as well as the motion data of the motion carried out by the ship with respect to a stationary (earth-fixed) coordinate system are detected, for example, by means of a satellite navigation system and/or an inertial navigation system. Then, at least one imminent point in time is computed at which the ship 1 takes up its neutral position marked 1A in FIG. 3. The landing spot L will thereby be in its reference position at a 0° roll angle, and the landing platform will therefore take up its reference alignment, specifically horizontally with respect to the approach path G. By way of a fast data link connection symbolized by the arrow 3, this computed point in time is transmitted from the ship 1 to the approaching aircraft 2 and is merged there into its landing control device, for example, into an onboard computer.

The reference position of the landing spot L in the absolute earth-fixed coordinate system is now known in the aircraft, and also at least one point in time in the future at which the landing spot L will take up this reference position is known to the onboard computer of the aircraft 2. When it is assumed that at this point in time the reference position of the aircraft carrier is also horizontal, the onboard computer will also know this reference position. Otherwise, a corresponding reference position, which the ship will take up at the point in time in the future, can also be transmitted by way of the fast data link connection 3 from the ship to the aircraft and can be made available there to the on-board computer.

Since the computer of the landing control device of the aircraft 2 now knows the location and the point in time at which the aircraft 2 should touch down on the deck 10 of the ship 1, the landing control device, in the knowledge of the actual position of the aircraft 2 also detected by way of a satellite navigation system or by way of an inertial navigation system, can control the aerodynamic control surfaces as well as the propulsion of the aircraft 2 in such a manner that the aircraft 2 will move on the gliding path G and touch down on the landing spot L at the precalculated point in time. For this purpose, the controlling of the aircraft takes place such that the touchdown location of the aircraft on the deck 10 of the ship 1, which was precalculated by the landing control device, corresponds to the reference position of the landing spot (0° roll angle of the ship) and that the touchdown point in time precalculated by the landing control device, i.e. the point in time of reaching the touchdown location, corresponds to one of those points in time in the future at which the landing spot takes up its neutral position marked L in FIG. 3. At this point in time, the aircraft will, in addition, take up an attitude which, essentially parallel to the predefined horizontal line or to the reference position transmitted by way of the data link connection 3 from the ship 1 to the aircraft 2, corresponds to the lateral inclination of the deck 10.

In this fashion, the aircraft 2 can land without a constant recorrecting of its own attitude essentially uninfluenced by cross wind and also uninfluenced by a rolling motion of the ship 1.

Naturally, in this manner, not only the rolling motion of the ship 1 can be compensated but also a motion of the ship about its lateral axis (pitching) or also a motion of the ship about its vertical axis (yawing).

If not only the motions of the ship about its three space axes but also translatory motions of the ship along one of its three spaces axes enter into the determination of the imminent point in time at which the landing spot L will take up its reference position, it becomes possible to land the aircraft reliably and safely on the ship 1 even when the latter is traveling or is subject to a drift. In this case, the position data of the landing spot at the imminent landing point in time detected onboard the ship as well as preferably also the motion data of the ship or of the landing platform along at least one of its space axes are transmitted by way of the fast data link connection 3 to the onboard computer and thus to the landing control device of the approaching aircraft 2. The computation of the imminent point in time at which the landing spot will take up the reference position (at a 0° roll angle of the ship), and the absolute location of the landing spot at this point in time with respect to a stationary earth-fixed coordinate system or to the moving coordinate system of the aircraft 2 or of the ship 1 may be carried out either onboard the aircraft or onboard the ship, in which case the results can then, as required, be transmitted by way of the fast data link connection 3 between the ship 1 and the aircraft 2.

The solution according to the invention to the initially mentioned problem is therefore based on the fact that the instantaneous touchdown spot of the aircraft on the ship can be announced to the incoming aircraft at any time by way of a high-speed data connection. As a result of its own speed over the ground known to the aircraft, of its own flight altitude as well as the distance also known to the aircraft between the aircraft and the touchdown spot, thus, the landing spot L, on the deck 10 of the ship 1, the aircraft 2 is capable at any time to precalculate the estimated time of arrival and thus the precise position of its own touchdown spot. The control of the aircraft will then regulate the gliding path G of the landing approach such by influencing the rate of descent and the flying speed that the precalculated touchdown spot coincides with the landing spot when the latter takes up its reference position, thus when the rolling motion of the ship 1 is at the zero point.

As a result of the coordination of the wind direction data as well as of the geographical altitude difference between the aircraft 2 and the deck 10 of the ship 1 and the announcement of the longitudinal axis of the ship or of the alignment of the landing runway axis relative to the longitudinal axis of the ship by way of the high-speed data connection 3, the aircraft 2 can safely land on the deck 10 of the ship as if on a bearing line.

The hardware components required for the implementation of the landing procedure according to the invention, as a rule, are present on the ship as well as in the aircraft, so that, while using these components, only a corresponding flight guiding software onboard the aircraft and a corresponding rolling position computing software onboard the ship as well as a corresponding high-speed data transmission connection between the ship and the aircraft, preferably a line-of-sight data connection between the ship and the aircraft have to be provided. As a rule, highly precise position indicating systems, such as satellite navigation systems, are present on the ship 1 as well as in the aircraft 2. Furthermore, an inertial navigation system for the exact measuring of the actual rolling position of the ship is necessary at least on the ship. Normally such a system is part of the ship's equipment, particularly of the equipment of an aircraft carrier. Finally, an automatic speed control is required onboard the aircraft for the rate of descent and the flying speed in order to be able to precisely observe the estimated time of arrival on the landing spot L. Such a speed control system generally also exists onboard of aircraft. Thus, by means of relatively low expenditures, the precision of landings of aircraft on moving platforms, especially aircraft carriers and other suitable ships can be improved. Not only the landing can thereby be automated but, in addition, it becomes possible to carry out safe landings for remote-controlled unmanned aircraft on platforms of this type.

Reference symbols in the claims, the description and the drawings are used only for a better understanding of the invention and should not limit the scope of protection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS

1 Ship
2 aircraft
3 data link connection
10 deck
11 center plane
12 line
20 main landing gear
S center of gravity
M metacenter
H deck line
G gliding path
W water surface
L landing spot
L' landing spot
L" landing spot

What is claimed is:

1. A method for automatically landing a conventional take-off and landing aircraft on a movable landing platform, comprising the acts of:
   detecting position data of an intended landing spot onboard the movable landing platform;
   detecting motion data of a motion of the landing platform about at least one of its space axes;
   determining at least one imminent point in time at which the intended landing spot will be located at a reference position in an absolute coordinate system at which the conventional take-off and landing aircraft is projected to meet the movable landing platform when the movable landing platform is at least approximately horizontal relative to a roll axis of the movable landing platform;
   transmitting the at least one imminent point in time and at least the reference position in the absolute coordinate system to a landing control device of the conventional take-off and landing aircraft; and
   controlling the conventional take-off and landing aircraft such that a touchdown spot of the conventional take-off and landing aircraft on the movable landing platform, calculated by the landing control device based on at least the transmitted at least one imminent point in time and the reference position in the absolute coordinate system, corresponds to the reference position at a time which corresponds to the at least one imminent point in time.

2. The method for the automatic landing of a conventional take-off and landing aircraft according to claim 1, wherein before the landing of the conventional take-off and landing aircraft, the movable landing platform is aligned such that the longitudinal axis of a landing runway provided on the movable landing platform is turned into the wind to minimize cross wind influences.

3. The method for the automatic landing of a conventional take-off and landing aircraft according to claim 2, wherein the alignment of the movable landing platform takes place continuously during a landing approach of the conventional take-off and landing aircraft.

4. The method for the automatic landing of a conventional take-off and landing aircraft according to claim 1, wherein at least one of the space axes for which the motion data are detected is a longitudinal axis of the movable landing platform.

5. The method for the automatic landing of a conventional take-off and landing aircraft according to claim 1, wherein at least one of the space axes for which the motion data are detected is a lateral axis of the movable landing platform.

6. The method for the automatic landing of a conventional take-off and landing aircraft according to claim 1, wherein one of the space axes for which the motion data are detected is a vertical axis of the movable landing platform.

7. The method for the automatic landing of a conventional take-off and landing aircraft according to claim 1, wherein
in the act of determining motion data, translatory motion data of the landing platform in the direction of at least one of the space axes are detected,
in the act of determining at least one imminent point in time, the translatory motion data is used in the determination,
in the act of transmitting, the translatory motion data are transmitted to the landing control device of the conventional take-off and landing aircraft, and
in the act of controlling, the translatory motion data is used for controlling the conventional take-off and landing aircraft.

8. A system for the automatic control of the landing of a conventional take-off and landing aircraft on a moving landing platform, comprising:
a movable landing platform having a position detection device, a motion detection device, and a data transmission device;
a conventional take-off and landing aircraft having an automatic navigation device and an automatic landing control device,
wherein
the transmitting device is configured to transmit at least a predetermined point in time at which a landing spot on the landing platform will take up a reference position in an absolute coordinate system at which the conventional take-off and landing aircraft is projected to meet the movable landing platform when the movable landing platform is at least approximately horizontal relative to a roll axis of the movable landing platform, and
the landing control device of the conventional take-off and landing aircraft is configured to receive the data transmitted by the transmitting device and control landing of the conventional take-off and landing aircraft at the reference position in the absolute coordinate system, and to control the conventional take-off and landing aircraft such that the reference position will be reached by the conventional take-off and landing aircraft at the predetermined point in time.

9. The system according to claim 8, wherein the landing control device is further configured to control the conventional take-off and landing aircraft taking into account a predefined reference alignment of the landing platform at the predetermined point in time at which the landing spot corresponds to the reference position.

* * * * *